United States Patent [19]
Hume et al.

[11] 4,313,210
[45] Jan. 26, 1982

[54] THERMALLY RESPONSIVE POWER CONTROL FOR A RADIO TRANSMITTER

[75] Inventors: Edward F. Hume; Steven C. Hand, both of Fort Worth, Tex.

[73] Assignee: Motorola, Inc., Schaumburg, Ill.

[21] Appl. No.: 117,402

[22] Filed: Jan. 31, 1980

Related U.S. Application Data

[63] Continuation of Ser. No. 899,035, Apr. 24, 1978, abandoned.

[51] Int. Cl.³ .............................................. H04B 1/04
[52] U.S. Cl. .................................... 455/117; 455/127; 330/207 P
[58] Field of Search ............................. 455/117, 127; 330/207 P, 289, 298; 331/62; 328/11, 259

[56] References Cited

U.S. PATENT DOCUMENTS

| 3,641,451 | 2/1972 | Hollingsworth et al. | 455/117 |
| 3,866,136 | 2/1976 | Augustin et al. | 330/207 P |
| 4,019,150 | 4/1977 | Lurey et al. | 455/117 |
| 4,021,701 | 5/1977 | Davies | 330/207 P |
| 4,122,400 | 10/1978 | Medendorp et al. | 455/117 |
| 4,158,180 | 6/1979 | Challen | 455/117 |

Primary Examiner—Jin F. Ng
Attorney, Agent, or Firm—James A. Scheer; James W. Gillman

[57] ABSTRACT

Sense voltages representative of transmitter power and the temperature of the transmitter output stage are summed and fed to the input of a high gain amplifier. The output of the amplifier provides bias to the transmitter driver stage and, thus, controls the total transmitter developed power. The resulting overall feedback system provides precise transmitter power control and output stage thermal protection.

2 Claims, 1 Drawing Figure

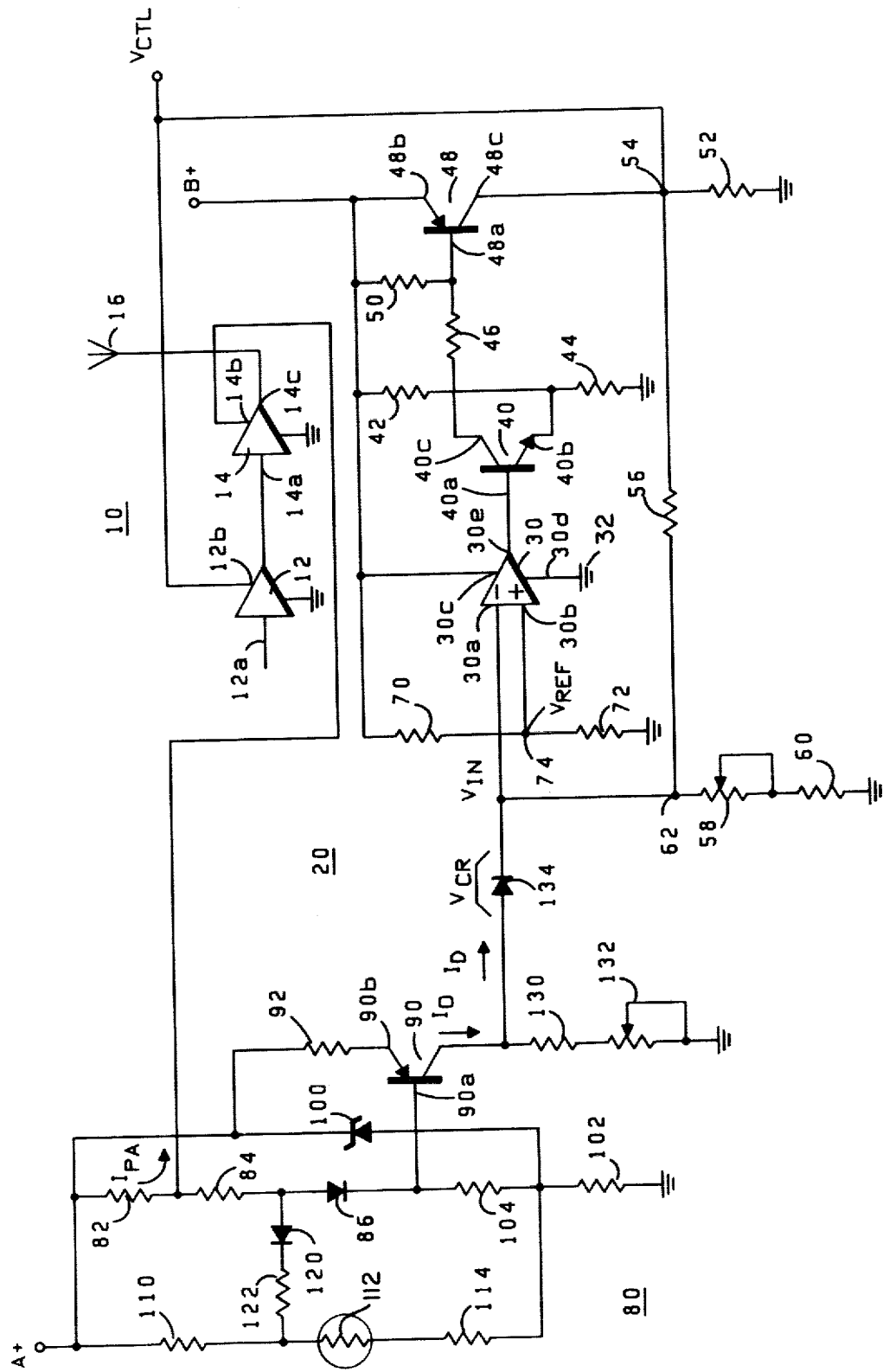

THERMALLY RESPONSIVE POWER CONTROL FOR A RADIO TRANSMITTER

This is a continuation of application Ser. No. 899,035, filed April 24, 1978, now abandoned.

BACKGROUND OF THE INVENTION

This invention pertains to the radio communication art and, more particularly, to a means for monitoring and controlling the power developed by a radio transmitter.

The prior art has developed numerous means for monitoring and controlling the output of radio frequency transmitters to a preset level. The need for such means is a result both of governmental controls regulating the maximum output of transmitters as well as a manufacturer's requirement that each transmitter he produces is capable of producing a given power level.

Two methods are normally used to sense the forward power developed by the transmitter. In one method, sensing current limiting to the final stage of the transmitter is employed. In the other, forward power out of the amplifier is sensed.

Also, techniques have been developed for monitoring the temperature of the transmitter output stage, and reducing the output power level if the sensed temperature exceeds a predetermined limit.

Prior art transmitter power control circuits which employ power limiting and thermal sensing have not proven to be precise in operation. In addition, they have become very complex and specialized working over a narrow power and/or frequency range. This, basically, due to the fact that prior art circuit configurations for limiting power output, and sensing output stage operating temperature have also been sensitive to unrelated circuit parameters such as circuit component values, bias voltages and output load variations. The lack of precision in prior art transmitter power control circuits has resulted in transmitters which either cannot produce or maintain their rated power, or generate in excess of their allowed power level.

SUMMARY OF THE INVENTION

It is an object of this invention, therefore, to provide a thermally responsive transmitter power control circuit which is substantially immune to variations in unrelated parameters.

Basically, according to the invention, a power control circuit is provided which monitors and controls the power level of a radio frequency transmitter. The power control circuit includes a control means which has first and second inputs and a control output. The control means responds only to signals received at its inputs to produce a predetermined control signal at its output. The control output of the control means is coupled to the transmitter for predeterminedly controlling the power level thereof. A first feedback means is provided which senses the power level of the transmitter and produces a predetermined first sense signal in response thereto. A second feedback circuit senses the temperature of a predetermined portion of the transmitter and produces a second predetermined sense signal in response thereto. A provided coupling means couples the first and second sense signals to the control means first and second inputs, respectively, whereby the control signal produced by the control means is determined solely by the first and second feedback signals.

BRIEF DESCRIPTION OF THE DRAWING

The attached drawing is a schematic diagram illustrating a preferred embodiment of the power transmitter power control circuit.

DETAILED DESCRIPTION OF THE PREFERRED EMBODIMENT OF THE INVENTION

The attached FIGURE illustrates, in schematic diagram form, the output stages of a power amplifier, indicated generally at 10, comprised of a driver 12 having a modulation 12a and a bias input 12b, and an output stage 14 having an input 14a, a bias input 14b and an output 14c. The driver stage 12 and output stage 14 are of conventional design whereby a signal appearing at the driver input 12a is amplified to an appropriate power level and appears at the output 14c of the output stage 14 whereby it then may be utilized, as to radiate over a provided antenna 16.

It is a characteristic of the transmitter output stage 10 that the power level is determined by the peak-to-peak signal swing, which, in turn, is determined by the bias voltage applied at the driver bias input 12b. Also, the power developed by the amplifying stage 10 is directly related to the current $I_{PA}$ which flows into the bias input 14b of the output stage 14. Thus, as will be understood more fully hereinbelow, the total transmitter output may be monitored by sensing the current $I_{PA}$ and controlled by controlling the voltage applied to the driver bias terminal 12b.

The preferred embodiment of the instant transmitter monitor and control circuit is indicated generally at 20.

The heart of the system is a high gain operational amplifier 30 which has inverting and noninverting inputs 30a, 30b, respectively, an input bias terminal 30c, connected to a source of DC bias B+, and a negative, or ground terminal 30d connected to reference, or ground potential 32. While any well known and commercially available high gain operational amplifier 30 may be employed, an MC 1741 operational amplifier, available from Motorola, Inc. was used in this, the preferred embodiment of the invention.

Acting in the known manner, operational amplifier 30 amplifies the differential signal appearing at its inputs 30a, 30b by a high open loop gain value, the resulting output voltage appearing at the amplifier's output terminal 30c. The output of the high gain operational amplifier 30 couples to the base 40a of an NPN transistor 40. The emitter 40b of transistor 40 is connected to the common node of a voltage divider comprised of resistors 42 and 44 which connect between B+ and ground potential. This voltage divider assures that transistor 40 does not conduct collector current until a suitable, predetermined voltage appears at the output 30e of operational amplifier 30. The collector 40c of transistor 40 couples through a coupling resistor 46 to the base 48a of an output PNP transistor 48. Bias to stage 48 is provided by bias resistor 50 which couples from the emitter 48b to the base 48a of stage 48. The emitter 48b of transistor 48 is directly connected to the supply, B+.

The collector 48c of transistor 48 couples through a load resistor 52 to ground potential. The voltage $V_{CTL}$ appearing across resistor 52 at node 54 comprises the regulated output voltage $V_{CTL}$ of the control circuitry 20, as will be more fully understood hereinbelow. A provided voltage divider is comprised of resistor 56, potentiometer 58 and resistor 60. The common node, 62 of resistor 56 and potentiometer 58 is fed, to the inverting input 30a of operational amplifier 30. The voltage at this input is defined as $V_{IN}$.

A voltage divider comprised of resistors 70 and 72 series connects between the power supply, B+ and ground potential, with their common node 74 feeding to the noninverting input 30b of operational amplifier 30. The voltage at this input is defined as $V_{REF}$.

Thus, $V_{REF} = B + \frac{R72}{R70 + R72}$.

The voltage $V_{IN}$ applied to the inverting input is derived from the control voltage $V_{CTL}$. Thus, $$V_{IN} = V_{CTL} \frac{R58 + R60}{R58 + R60 + R56}.$$

The voltage $V_{IN}$ is held equal to $V_{REF}$ by the high open loop gain of operational amplifier 30. Therefore, $$V_{CTL} = B + \frac{R72}{R70 + R72}\left[1 + \frac{R56}{R58 + R60}\right].$$

This valve of $V_{CTL}$ defines the maximum voltage that will be applied to the driver bias terminal 12b.

Feedback signals representative of transmitter output power and the temperature of the transmitter output stage are received and processed by processing circuitry indicated generally at 80. Here, current to the output stage 14 of the transmitter section 10 is coupled from a second source of DC bias, A+, through current sense resistor 82 to the output stage bias input 14b. The output stage current $I_{PA}$ is proportional to the total output stage power. Thus, the voltage drop across resistor 82 is representative of developed transmitter power. This voltage is coupled through resistor 84 and diode 86 to the base 90a of a PNP transistor 90. Transistor 90 has its emitter 90b coupled to the second DC power supply A+ through an emitter resistor 92.

Bias to the base 90a of transistor 90 is also provided through Zener diode 100 which is biased between A+ and ground through resistor 102. The resulting voltage across Zener diode 100 is coupled to the base 90a of transistor 90 through a resistor 104.

Also applied to the base 90a of transistor 90 is a voltage representative of the operating temperature of the transmitter's output stage 14. This circuit is comprised of the series connection of resistor 110, thermistor 112 and resistor 114 which couple between A+ and the common connection of resistors 102 and 104. A diode 120 and resistor 122 connect between the common connection of resistor 84 and diode 86 and the common connection of resistor 110 and thermistor 112.

In the conventional manner, thermistor 112 is in thermal contact with that portion of the transmitter output 14 which it is intended to sense and, in this, the preferred embodiment of the invention, thermistor 112 is thermally mounted to the output stage 14 heat sink.

As will be more fully understood hereinbelow, the resulting bias applied to the base 90a of transistor 90 from the sensed output current and output stage temperature, result in a collector current $I_o$ which flows through transistor 90. A portion of this current is connected to ground through series coupled resistor 130 and potentiometer 132. The remaining portion of the current, $I_D$, is coupled through a diode 134 and applied to the inverting input 30a of the operational amplifier 30, reducing $V_{CTL}$ below the maximum voltage previously established.

Circuit analysis establishes the following relationship between output stage 14 current $I_{PA}$ and the control voltage $V_{CTL}$ applied to the bias input 12b of the driver stage 12.

$$I_o = I_{PA}\frac{R82}{R92}\frac{R104}{R84+R104} + V_z\frac{1}{R92}\frac{R84}{R84+R104} + V_{CR}\frac{1}{R92}\frac{R104}{R84+R104} - V_{BE}\frac{1}{R92},$$ where $V_z$ is the voltage drop across Zener diode 100, $V_{CR}$ is the voltage drop across diode 86 and $V_{BE}$ is the base emitter voltage of transistor 90.

From the above equation, $$\Delta I_o = \Delta I_{PA}\frac{R82}{R92}\frac{R104}{R84+R104}$$

From circuit constraints, $$\Delta I_D = \Delta I_o$$
$$\Delta V_{CTL} = -\Delta I_D R56$$

Therefore:

$$\Delta V_{CTL} = -\Delta I_{PA}\frac{R82}{R92}\frac{R104}{R84+R104} \times R56$$

Thus, a change in the control voltage $V_{CTL}$ occurs corresponding to a proportionate change in output stage 14 current $I_{PA}$. Since the current $I_{PA}$ is proportional to output stage power, and since the control voltage $V_{CTL}$ applied to the bias input 12b of driver stage 12 determines the transmitter 10 developed power, it is seen that by a proper choice of resistors 56, 82, 84, 92 and 104 the control voltage $V_{CTL}$ can be set up to control the transmitter power stage 10 to any desired preset level.

The operation of the thermal feedback compensation may be understood as follows. When temperature increases, the resistance of thermistor 112 is reduced thereby turning on diode 120 causing an additional current through resistor 84. This results in a greater emitter voltage across resistor 92 and, therefore a higher collector current $I_o$. A higher $I_o$ current implies a higher $I_D$ current, thereby increasing the voltage at node 62 and, since the operational amplifier tends to make the voltage at its two inputs 30a, 30b equal, resulting in a lower control voltage $V_{CTL}$ at node 54 causing lower drive to output stage 14 thereby reducing the current $I_{PA}$. Thus, by proper selection of the thermistor 112, and its associated bias components, the output power at the output 14c of output stage 14 can be made to exhibit any desired thermal response.

A particular feature of the instant invention, as illustrated in the preferred embodiment of the invention, is the fact that its power sensing and thermal sensing signals are applied as overall feedback signals in a closed loop, high gain system. The advantage of this configuration over those known in the prior art is that the produced control signal $V_{CTL}$ which controls the maximum allowable transmitter output power is virtually totally controlled by desired circuit components and is substantially independent of variables unrelated to desired circuit performance such as component tolerances or bias voltages. Thus, the transmitter power is solely a function of the two sensed voltages.

In summary, a high precision radio transmitter power monitor and control circuit has been described.

While a preferred embodiment of the invention has been described in detail, it should become apparent that many modifications and variations thereto are possible, all of which fall within the true spirit and scope of the invention.

We claim:

1. A power control circuit for monitoring and controlling the power level of a radio frequency transmitter, said transmitter having a power source input, comprising:

reference means for providing a predetermined fixed reference potential, control means coupled to the reference means, having an input and a control output, said control means being responsive only to the difference between the predetermined fixed reference potential and the signal received at its input to produce a predetermined control signal at its output;

means for coupling said control output to said transmitter for predeterminedly controlling the power level thereof;

first feedback means, comprising a current sensing resistor connected in series with the power source input of said transmitter and producing a first sense signal representative of the current drawn by said transmitter;

second feedback means for sensing the temperature of a predetermined portion of said transmitter and producing a second predetermined sense signal in response thereto; and means for predeterminedly combining the first and second sense signals produced by said first and second feedback means, and coupling the combined signal to the input terminal of said control means, whereby the control signal produced by said control means is determined solely by said first and second feedback signals.

2. The power control circuit of claim 1 wherein said second feedback means comprises a temperature sensitive means in thermally contacting engagement with a portion of said transmitter for producing a voltage representative of the temperature thereof.

* * * * *